Patented Feb. 14, 1950

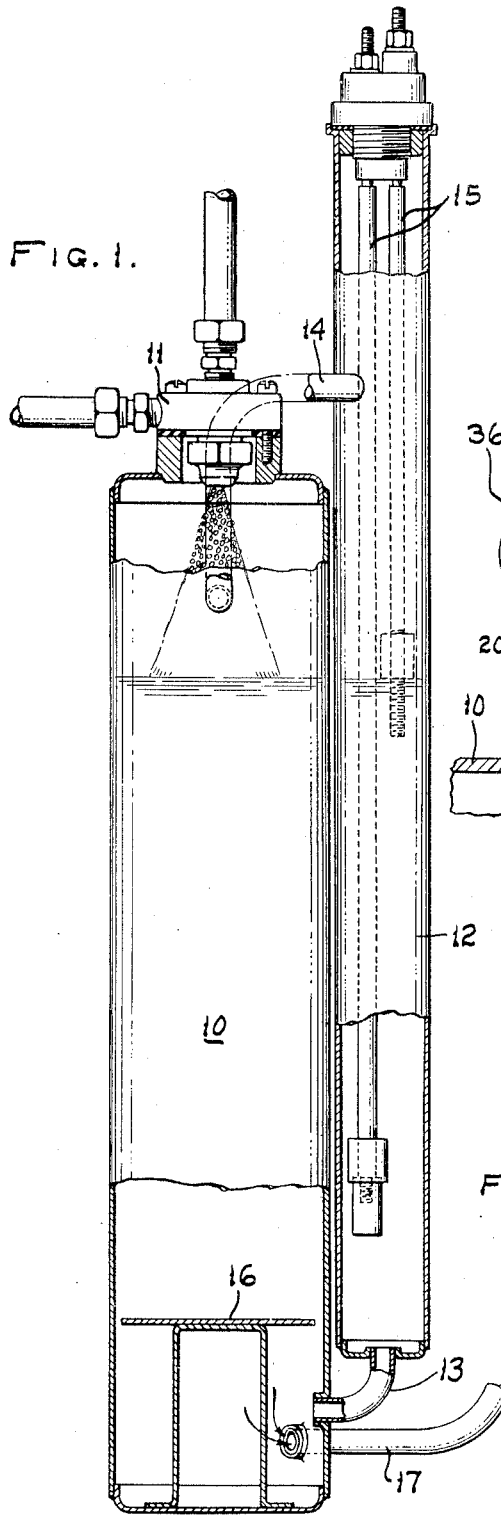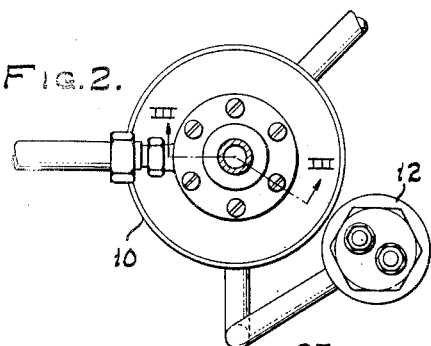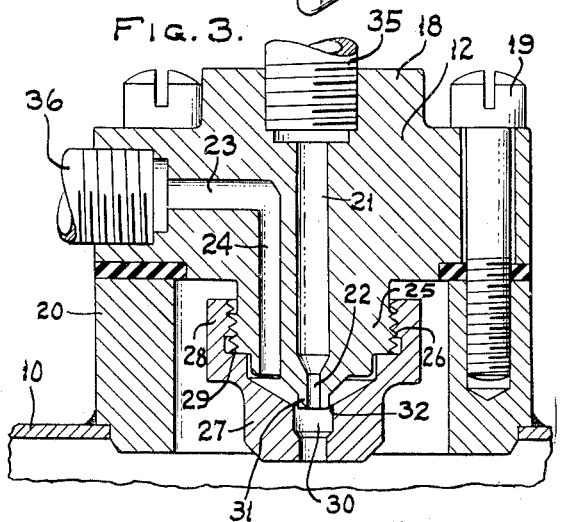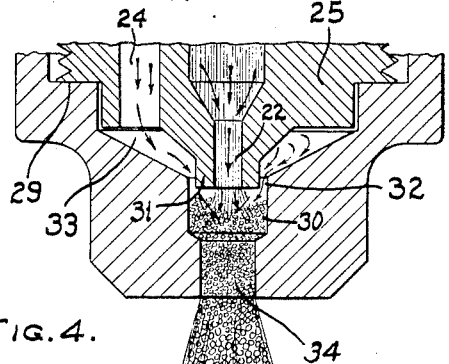

2,497,741

UNITED STATES PATENT OFFICE 2,497,741

CARBONATOR APPARATUS

Anthony A. Quimper, Westfield, Mass., assignor to Westinghouse Electric Corporation, East Pittsburgh, Pa., a corporation of Pennsylvania Application October 24, 1947, Serial No. 781,788

1 Claim. (Cl. 261—116)

This invention relates to carbonation, that is, to the impregnation of water with carbon dioxide gas to produce carbonated water for beverage purposes.

It is well known that the quality of carbonated water depends largely upon the thoroughness of the solution of carbon dioxide in the water and upon the quantity of carbon dioxide, expressed in the ratio of volumes of gas to a given volume of water, dissolved in the water. The amount of dissolved carbon dioxide contributes the quality of effervescence so desirable to produce a palatable beverage.

Two requirements of a carbonator are the capacity to produce a high degree of carbonation and to do it efficiently, that is, to utilize the available carbon dioxide to the fullest extent. Another desirable quality is an absence of moving parts, such as the commonly used agitators.

Further, and particularly in a carbonator designed to be used in a compact arrangement such as an automatic drink dispensing machine, the device should occupy as small a space as possible and preferably should afford substantially instantaneous carbonation of a small quantity of water as it is required for beverage purposes, rather than to hold a large quantity of pre-carbonated water in reserve.

Further, the carbonator should be capable of supplying an adequate supply of highly carbonated water when the dispensing machine is being operated at its full capacity for a substantial period of time.

With the foregoing objectives in view, I have designed the carbonator herein described and illustrated in the accompanying drawings, wherein:

Fig. 1 is a front elevation, partially in section showing a carbonator assembly embodying the invention;

Fig. 2 is a plan view of the assembly;

Fig. 3 is a vertical section on an enlarged scale taken on line III—III of Fig. 2 and showing the detailed construction of the mixing nozzle; and Fig. 4 is a section showing the mixing portion of the mixing nozzle.

The carbonator comprises a closed shell or pressure vessel 10 for receiving and storing carbonated water, a gas and water mixing nozzle 11 disposed at the top of, and discharging into the vessel 10, and a liquid level control means comprising a chamber 12 attached to and in open communication with the vessel 10.

The particular form the pressure vessel and the liquid level control means takes is not particularly important, but it is preferred that vessel 10 be cylindrical as shown and, because of the turbulence in the storage chamber, the liquid level control means preferred is a cylindrical chamber 12 connected at its lower end by a conduit 13 to the lower end of vessel 10, and near its upper end by a conduit 14 to the upper end of the storage vessel. Thus the same liquid level and pressure obtains in both chambers. The liquid level is here shown as controlled by a pair of suitably spaced electrodes 15 in chamber 12 this being a type of control well known in the art. A baffle plate 16 may be located in vessel 10 near its lower end to provide a quiescent zone adjacent the discharge conduit 17 leading from the carbonator.

The mixing nozzle 11 comprises a main body portion 18 clamped by suitable bolts 19 to a ring 20 welded in the head of vessel 10. The body portion has a long central passage 21 terminating at its lower end in a shorter passage 22. These ports constitute a water passage.

The body portion is drilled laterally to provide a passage 23 which communicates with a vertical passage 24 paralleling the water passages 21 and 22. It should be here noted that the lower end portion 25 of the main body portion is reduced in size and is externally threaded as at 26.

A member 27 resembling a nut is internally threaded at its upper end 28 for engagement with the threads 26 of the main body portion 18. It should be noted that the lower end 25 of the body portion 18 and the upper inner bore of nut 27 have cooperating flat portions 29 which limit the movement of the nut relative to the main body portion. This ensures accurate spacing of the ports and passages of the nozzle assembly.

That portion of the nut just below the discharge end of the water port 22 is drilled to provide a mixing chamber 30. It should be noted that there is a short tip or extension 31 from the body portion 25, which extension just penetrates into the mixing chamber 30. It should also be noted that this extension 31 is spaced from the side walls of the mixing chamber to form a restricted area 32.

The port 24 provides the entry passage for carbon dioxide into a circular and angular chamber 33 formed between the upper part of nut 27 and the lower end 25 of the main body portion. The gas then flows or rather is aspirated through restriction 32 and enters mixing chamber 30 where it meets the water coming from port 22. The carbonated water is discharged from the mixing chamber into the storage vessel 10 through a port 34. The diameter of the port 34 is somewhat less than that of the mixing chamber 30.

Water under pressure is brought to the port 21 through a conduit 35 and carbon dioxide gas is brought to port 23 through a conduit 36.

For discussion of the operation of the device it will be assumed that a pressure of sixty pounds per square inch prevails in the carbon dioxide system, and accordingly in the pressure vessel 10. Water under pressure is forced through ports 21 and 22 from which it discharges as a pencil-like stream into the mixing chamber 30. In general, the higher the water pressure, up to a certain limit, the higher will be the degree of carbonation, but within the limits of carbonation required for a satisfactory mixed drink (about 1 part of sugar syrup to 5 parts of carbonated water) a carbon dioxide content of about 3.5 volumes has been found satisfactory. Of course, to obtain this ultimate volume in the finished drink, the carbonation volume of the water must be higher in the carbonator, as there is loss of carbon dioxide when the water is drawn to the atmosphere and diluted with syrup.

A further factor in a successful carbonator is that the volume of water available must be equal to the demands on the dispensing system at times of peak draw and that the water so drawn shall meet the above-mentioned requirements as to carbon-dioxide content.

These factors point to two prime requirements for a successful carbonator: (1) adequate carbonation and (2) instantaneous carbonation, the latter being particularly important if the use of a large storage vessel is to be avoided. With these considerations in mind, a nozzle capable of producing from 25 to 35 gallons of carbonated water per hour will be described. Assuming that port 22 has a diameter of 0.053 inch, this volume of water can be obtained at water pressures ranging from 80 to 100 pounds per square inch. The diameter of the tip extension 31 in which port 22 terminates is 0.102 inch and the diameter of the mixing chamber 30 into which tip 31 projects is 0.141 inch. This makes the area of the restricted passageway 32 between the tip and the mixing chamber, between 0.019 and 0.02 inch.

Now under these conditions when water at a pressure of from 80 to 100 pounds is supplied to the nozzle, a pencil-like stream at high velocity flows from port 22 into the mixing chamber 30. At this time the pressure in the carbon dioxide system, that is in ports 23 and 24, chamber 33 and the vessel 10, is 60 pounds per square inch. The flowing water at high pressure and velocity causes an aspirating effect on the gas in chamber 33 causing it to flow through the restricted area 32 at high velocity. There it strikes the water emerging from port 22 at tip 31, atomizing it into minute particles which is the best condition for absorption of carbon dioxide by water. Such absorption takes place in the small mixing chamber 30 immediately below tip 32 and the resultant carbonated water flows into the storage vessel 10 through the orifice 34. This completes the carbonating process.

The structure herein described has the advantage of no moving parts. The water pressure required for good carbonation is not excessively high. This is important where the water pressure must be supplied from a pump. Further, the construction is one that lends itself to a comparatively cheap construction as the parts of the nozzle may all be readily machined.

While my invention has been shown in but one form, it will be obvious to those skilled in the art that it is not so limited, but is susceptible of various changes and modifications without departing from the spirit thereof.

What I claim is:

A carbonator comprising a closed vessel, a nozzle assembly for supplying carbonated water to said vessel, water and carbon dioxide connections to said nozzle assembly, said nozzle assembly being attached to the upper end of said vessel in fluidtight relation therewith, said nozzle comprising a main body portion having passages therein for water and carbon dioxide gas therethrough, a cylindrical mixing chamber for gas and water provided in said nozzle assembly below the terminal points of said water and gas passages, said mixing chamber having a discharge port opening into said vessel, said main body portion being provided with a cylindrical tip portion extending only a slight distance into the mixing chamber and spaced a slight distance from the side walls thereof so as to provide a restricted passageway between the tip portion and the upper end of the side wall of the mixing chamber, said tip portion having a port therein to provide for the discharge of water therefrom under pressure into said mixing chamber, said mixing chamber surrounding said tip portion, whereby when water is discharged at relatively high pressure from said hollow tip portion into said mixing chamber, carbon dioxide gas is aspirated from the chamber surrounding the tip portion into the mixing chamber to atomize and commingle with the water discharging from said tip portion to carbonate the said water, said carbonated water thereafter flowing into the closed vessel through the discharge port of the mixing chamber.

ANTHONY A. QUIMPER.

REFERENCES CITED

The following references are of record in the file of this patent:

UNITED STATES PATENTS

| Number | Name | Date |
|---|---|---|
| 534,848 | Adam | Feb. 26, 1895 |
| 1,075,408 | Deckebach | Oct. 14, 1913 |
| 1,572,470 | Diehl | Feb. 9, 1926 |
| 2,148,902 | Everson | Feb. 28, 1939 |
| 2,210,846 | Aghnides | Aug. 6, 1940 |
| 2,386,464 | Hogenmiller | Oct. 9, 1945 |
| 2,401,916 | Di Pietro | June 11, 1946 |

FOREIGN PATENTS

| Number | Country | Date |
|---|---|---|
| 509,491 | Great Britain | July 17, 1939 |